(12) United States Patent
Kawano et al.

(10) Patent No.: US 12,669,350 B2
(45) Date of Patent: Jun. 30, 2026

(54) SENSOR CORD AND SENSOR SYSTEM

(71) Applicant: PROTERIAL, LTD., Tokyo (JP)

(72) Inventors: Kei Kawano, Tokyo (JP); Yukio Ikeda, Tokyo (JP)

(73) Assignee: PROTERIAL, LTD, Tokyo (JP)

( * ) Notice: Subject to any disclaimer, the term of this patent is extended or adjusted under 35 U.S.C. 154(b) by 366 days.

(21) Appl. No.: 18/405,152

(22) Filed: Jan. 5, 2024

(65) Prior Publication Data

US 2024/0230377 A1 Jul. 11, 2024

(30) Foreign Application Priority Data

Jan. 11, 2023 (JP) ................................. 2023-002396

(51) Int. Cl.
*G01D 5/16* (2006.01)
(52) U.S. Cl.
CPC ...................................... *G01D 5/16* (2013.01)
(58) Field of Classification Search
CPC ....................................................... G01D 5/16
See application file for complete search history.

(56) References Cited

U.S. PATENT DOCUMENTS

| | | | | | |
|---|---|---|---|---|---|
| 3,705,993 | A | * | 12/1972 | Grigorovici | ........... H01C 10/10 29/25.35 |
| 2012/0182117 | A1 | * | 7/2012 | Tanba | .................... H01C 10/10 338/47 |

| | | | | |
|---|---|---|---|---|
| 2015/0291122 | A1 | | 10/2015 | Seo |
| 2018/0003523 | A1 | * | 1/2018 | Ikeda ..................... G01D 5/165 |
| 2019/0330577 | A1 | * | 10/2019 | Cramer ................... C12P 7/06 |

FOREIGN PATENT DOCUMENTS

| | | |
|---|---|---|
| JP | 2014505629 A | 3/2014 |
| JP | 2018006173 A | 1/2018 |

* cited by examiner

*Primary Examiner* — John E Breene
*Assistant Examiner* — Alex T Devito
(74) *Attorney, Agent, or Firm* — Meunier Carlin & Curfman LLC

(57) ABSTRACT

The sensor cord of the present disclosure includes a first linear member, a second linear member, a third linear member, and a deformable insulation layer containing the first to third linear members. On a cross-sectional surface of the sensor cord taken perpendicular to longitudinal directions of the sensor cord, the third linear member is situated between the first linear member and the second linear member and contacts the first linear member and the second linear member. In each of the first linear member, the second linear member, and the third linear member, at least an outermost peripheral part has electrical conductivity and has resistance greater than or equal to 250 Ω/m in the longitudinal directions. The third linear member is configured to deform at a portion where pressure is applied. Resistance at the portion where the pressure is applied varies depending on an amount of deformation.

4 Claims, 7 Drawing Sheets

SENSOR CORD AND SENSOR SYSTEM

CROSS-REFERENCE TO RELATED APPLICATIONS

This application claims the benefit of Japanese Patent Application No. 2023-002396 filed on Jan. 11, 2023 with the Japan Patent Office, the entire disclosure of which is incorporated herein by reference.

BACKGROUND

The present disclosure relates to a sensor cord and a sensor system.

A pedestrian protection device is mounted to a vehicle to reduce an impact a pedestrian experiences and to protect the pedestrian when the vehicle collides with the pedestrian. Examples of the pedestrian protection device include an active hood and a hood airbag. In order to properly activate the pedestrian protection device, a detection device that detects a collision with a pedestrian is required.

Published Japanese Translation of PCT International Publication for Patent Application No. 2014-505629 (Patent Document 1) and U.S. Patent Application Publication No. 2015/0291122 (Patent Document 2) disclose detection devices that detect a collision of a vehicle with a pedestrian. These detection devices include a flexible tube, fluid filled in the tube, and a pressure sensor that detects pressure from the fluid.

When the vehicle collides with the pedestrian, the tube is crushed through deformation of component parts of the vehicle. Crushing of the tube changes an internal pressure of the tube. This change in the internal pressure of the tube is transmitted inside the tube. The pressure sensor detects thus transmitted pressure change. Based on this pressure change, the detection device detects a collision of the vehicle with the pedestrian.

Japanese Unexamined Patent Application Publication No. 2018-006173 (Patent Document 3) discloses a position detection method as follows. A sensor cord includes a single resistance wire that has a resistance, and a single conductive wire that has a small resistance. The resistance wire and the conductive wire are disposed along an inner circumferential surface of a hollow insulation wire in an electrically contactless manner. One end of the resistance wire is connected to a constant current source. Both ends of the conductive wire are connected to the ground via a resistance. A voltage at a point of connection between the resistance wire and the constant current source is measured. When a pressing force is applied to a part of the sensor cord, the hollow insulation wire is deformed at the point of application of the pressing force. This deformation causes the conductive wire and the resistance wire to contact each other, which changes the voltage being measured. The point of the contact between the conductive wire and the resistance wire (in other words, the point where the pressing force is applied) is detected through the voltage change.

SUMMARY

Since the detection devices disclosed in Patent Documents 1 and 2 include a tube and the fluid filled in the tube, end portions of the tube need to be kept airtight. This makes the processing at the end portions of the tube complicated and accordingly makes the detection device expensive. In addition, a long-term reliability of the detection device cannot be promised. Meanwhile, the position detection method disclosed in Patent Document 3 cannot detect the magnitude of the pressing force applied.

One aspect of the present disclosure preferably provides a sensor cord and a sensor system that can detect the magnitude of a pressing force applied even without necessarily having a tube and fluid filled in the tube.

One aspect of the present disclosure is a sensor cord including a first linear member, a second linear member, a third linear member, and a deformable insulation layer containing the first linear member, the second linear member, and the third linear member. On a cross-sectional surface of the sensor cord taken perpendicular to its longitudinal directions, the third linear member is situated between the first linear member and the second linear member, and contacts the first linear member and the second linear member. In each of the first linear member, the second linear member, and the third linear member, at least an outermost peripheral part has electrical conductivity and has resistance greater than or equal to 250 $\Omega$/m in the longitudinal directions. The third linear member is configured to deform at a portion where pressure is applied. Resistance of the portion where the pressure is applied is configured to vary depending on an amount of deformation. The sensor cord of the present disclosure can detect the magnitude of a pressing force applied without necessarily having a tube and fluid filled in the tube.

BRIEF DESCRIPTION OF THE DRAWINGS

An example embodiment of the present disclosure will be described hereinafter with reference to the accompanying drawings, in which.

DETAILED DESCRIPTION OF EXEMPLARY EMBODIMENTS

First Embodiment

1. Configuration of Sensor Cord 1

Figure 1:
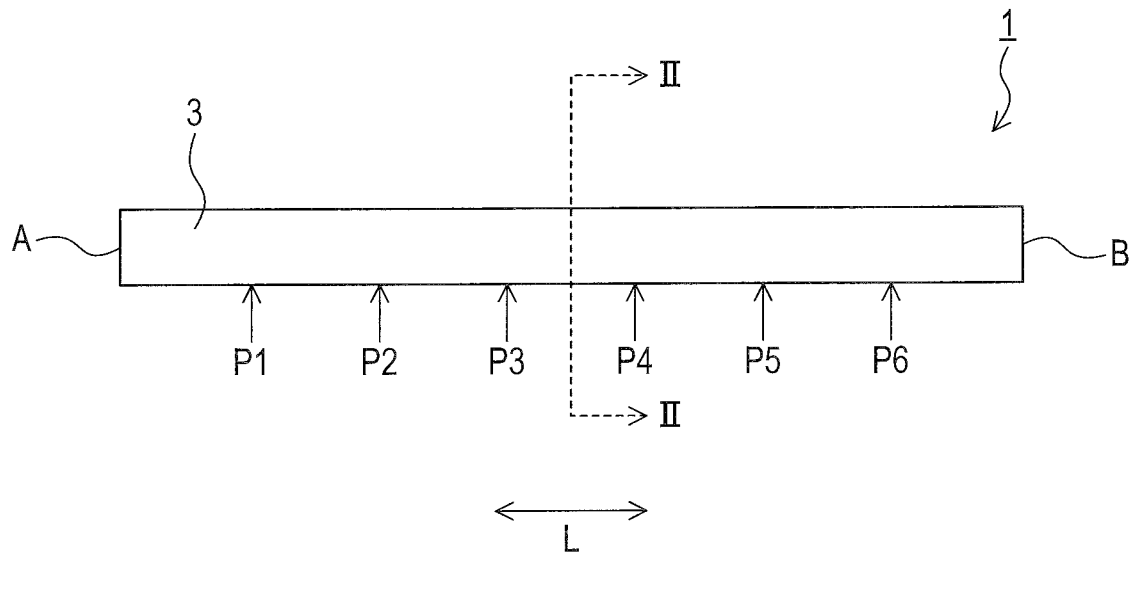
FIG. 1 is a side view showing a configuration of a sensor cord.

Configurations of a sensor cord 1 will be explained with reference to FIGS. 1 to 3. As shown in FIG. 1, the sensor cord 1 is a linearly shaped member. One end portion of the sensor cord 1 along its longitudinal directions L is referred to as an end portion A. Another end portion of the sensor cord 1 situated opposite the end portion A along the longitudinal directions L is referred to as an end portion B. Positions P1 to PN are arranged on the sensor cord 1, where "N" is a natural number greater than or equal to 2. Positions P1 to PN are equally spaced at a constant interval d from the end portion A towards the end portion B in the order from Position P1, P2, P3 . . . to Position PN.

In other words, the distance between Position Pi and Position Pi+1 in the longitudinal directions L is d, where "i" is any natural number selected from 1 to N–1. The distance between the end portion A and Position P1 as well as the distance between the end portion B and Position PN are also d. N equals to 6 in FIGS. 1, 4, and 5.

Figure 2:
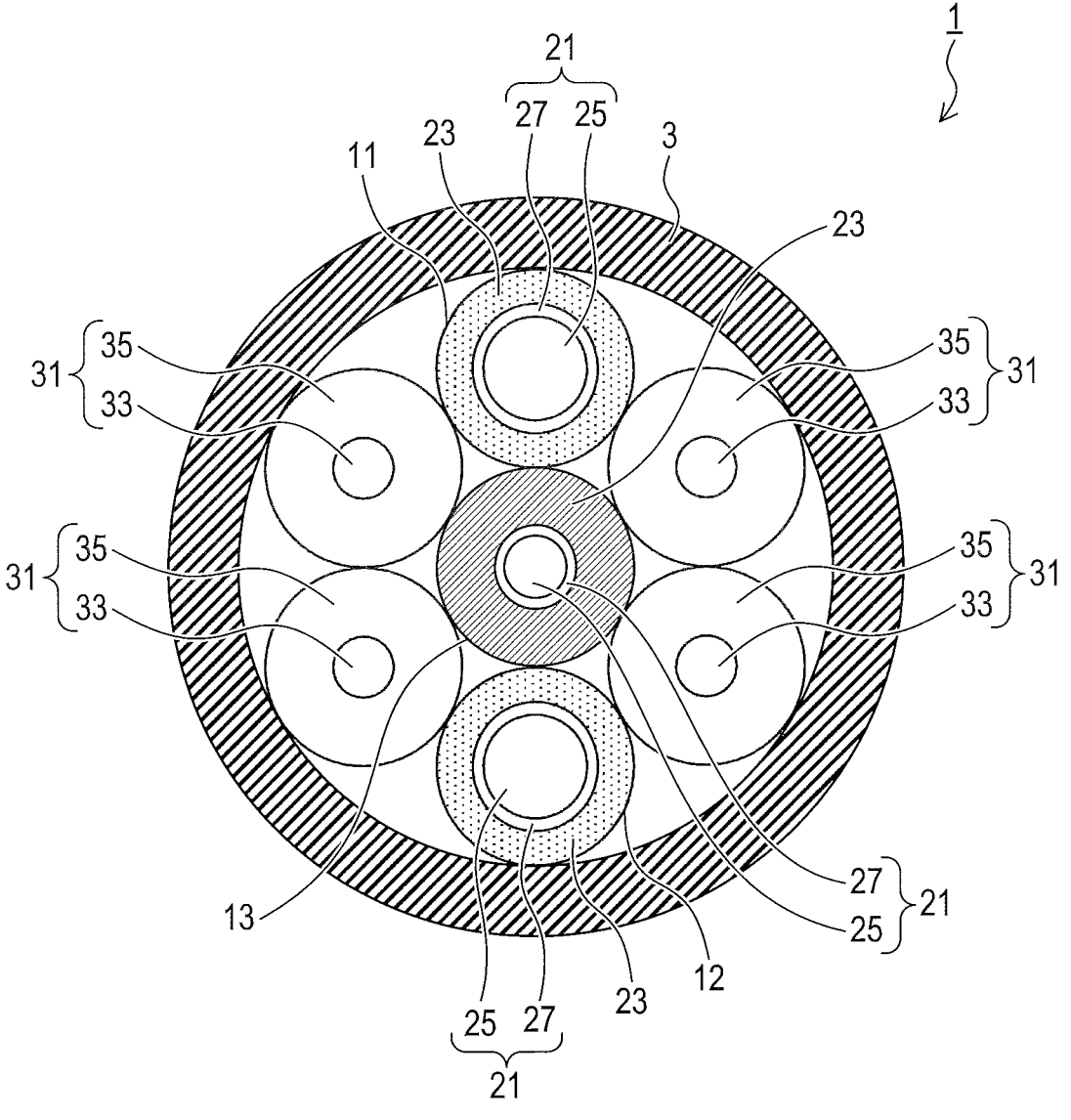
FIG. 2 is a cross-sectional view taken along line II-II in FIG. 1.

As shown in FIGS. 1 and 2, the sensor cord 1 includes an insulator 3. As shown in FIG. 2, the insulator 3 is a cylindrically shaped member. The axis of the cylinder agrees with the longitudinal directions L. The insulator 3 extends from the end portion A to the end portion B.

The insulator 3 includes an elastic body and is elastically deformable. When an external force is applied to the insulator 3, such part of the insulator 3 where the external force is applied is easily deformed. The insulator 3 has a function to electrically insulate a first linear member 11, a second linear member 12, and a third linear member 13, all of which will be explained later.

Examples of materials for the insulator 3 include rubber and plastic. Examples of the rubber may include urethane rubber, silicone rubber, ethylene-propylene rubber, styrene-butadiene rubber, and chloroprene rubber. Examples of the plastic may include polyethylene, ethylene-vinyl acetate copolymer, ethylene-ethyl acrylate copolymer, ethylene-methyl methacrylate copolymer, polypropylene, polyvinyl chloride, and olefin-based or ethylene-based thermoplastic elastomer. In addition, the plastic may also be engineering plastic such as polyimide and polyamide.

As shown in FIG. 2, the sensor cord 1 includes the first linear member 11, the second linear member 12, and the third linear member 13. The first linear member 11, the second linear member 12, and the third linear member 13 are accommodated inside the insulator 3. The first linear member 11, the second linear member 12, and the third linear member 13 each extend along the longitudinal directions L from the end portion A to the end portion B.

As shown in FIG. 2, the third linear member 13 is situated between the first linear member 11 and the second linear member 12 on a given cross-sectional surface taken perpendicularly to the longitudinal directions L.

The third linear member 13 contacts the first linear member 11 and the second linear member 12 entirely from the end portion A to the end portion B. In other words, an outer circumferential surface of the third linear member 13 contacts an outer circumferential surface of the first linear member 11 over the entire length of the sensor cord 1 from the end portion A to the end portion B; and the outer circumferential surface of the third linear member 13 contacts an outer circumferential surface of the second linear member 12 over the entire length of the sensor cord 1 from the end portion A to the end portion B. The first linear member 11 and the second linear member 12 do not contact with each other over the entire length of the sensor cord 1 from the end portion A to the end portion B.

The first linear member 11 includes a core material 21 and a conductive layer 23. The conductive layer 23 is formed around an outer periphery of the core material 21. The conductive layer 23 forms the outermost peripheral part of the first linear member 11. The core material 21 is an enameled wire, for example. The enameled wire includes a conductor 25 and an insulation layer 27. The conductor 25 includes copper, for example. The insulation layer 27 is, for example, made by applying enamel coating on an outer circumferential surface of the conductor 25 and baking the enamel coating. The core material 21 may be twisted small-diameter enameled wires.

The conductive layer 23 includes conductive rubber or conductive plastic, for example. The conductive rubber may include, for example, rubber and a conductive filler dispersed in the rubber. Examples of the rubber may include the rubber included in the insulator 3. Examples of the conductive filler may include carbon black.

The conductive plastic includes plastic and a conductive filler dispersed in the plastic, for example. Examples of the plastic may include the plastic included in the insulator 3. Examples of the conductive filler may include carbon black. In a case where the core material 21 is the enameled wire, the conductive layer 23 and the conductor 25 are electrically insulated from each other by the insulation layer 27.

The second linear member 12 is configured in the same manner as the first linear member 11. The third linear member 13 basically has the same configuration as the first linear member 11 and the second linear member 12. However, the conductive layer 23 of the third linear member 13 is larger than the conductive layers 23 of the first linear member 11 and the second linear member 12 in thickness in a radial direction. The core material 21 of the third linear member 13 has a diameter larger than the diameters of the core materials 21 of the first linear member 11 and the second linear member 12.

On a given cross-sectional surface taken perpendicularly to the longitudinal directions L, the first linear member 11, the second linear member 12, and the third linear member 13 are formed as below as shown in FIG. 2, for example. The first linear member 11, the second linear member 12, and the third linear member 13 each have a circular shape. The core materials 21 of the first linear member 11, the second linear member 12, and the third linear member 13 each have a circular shape. The diameters of the first linear member 11, the second linear member 12, and the third linear member 13 are the same. The first linear member 11, the second linear member 12, and the third linear member 13 are arranged on the same straight line. The first linear member 11 and the second linear member 12 each contact an inner circumferential surface of the insulator 3. In each of the first linear member 11, the second linear member 12, and the third linear member 13, the thickness of the conductive layer 23 in the radial direction is constant at any given circumferential point.

Shore A hardness of the conductive layers 23 of the first linear member 11, the second linear member 12, and the third linear member 13 is preferably greater than or equal to 20 and less than or equal to 80. In a case where the Shore A hardness is greater than or equal to 20, the mechanical strength of the conductive layer 23 increases, which reduces the risk of disconnection of the conductive layer 23. In a case where the Shore A hardness is less than or equal to 80, the flexibility of the sensor cord 1 increases and routing easiness improves.

The outermost peripheral part of each of the first linear member 11, the second linear member 12, and the third linear member 13 is the conductive layer 23. Accordingly, at least the outermost peripheral part has electrical conductivity in each of the first linear member 11, the second linear member 12, the third linear member 13.

The conductive layer 23 of each of the first linear member 11, the second linear member 12, and the third linear member 13 has resistance greater than or equal to 250 Ω/m in the longitudinal directions L. The length of each of the first linear member 11, the second linear member 12, and the third linear member 13 is 2 m for example. In this case, the conductive layer 23 of each of the first linear member 11, the second linear member 12, and the third linear member 13 has resistance greater than or equal to 500Ω.

When the third linear member 13 is pressed, a pressing force F is applied to the conductive layer 23 of the third linear member 13 and causes the conductive layer 23 to deform. The third linear member 13 is therefore configured to be deformed at the point of application of the pressing force. Examples of mode of deformation include compressive deformation. A resistance value Rv at the point of application of the pressing force (in other words, at the conductive layer 23 of the third linear member 13) varies depending on the amount of deformation of the conductive layer 23. FIG. 3 shows the relationship between the amount of compression of the conductive layer 23 and the resistance value Rv of the conductive layer 23. The larger the amount of compression of the conductive layer 23, the smaller the resistance value Rv is. The resistivity of a conductive rubber used in the measurement shown in FIG. 3 was 1 Ωcm. The diameter of the conductive rubber was 1 mm. The amount of compression corresponds to the amount of deformation.

As shown in FIG. 2, the sensor cord 1 includes four dummy lines 31. The dummy lines 31 are accommodated in the insulator 3. Each dummy line 31 is disposed along the inner circumferential surface of the insulator 3. Each dummy line 31 extends along the longitudinal directions L from the end portion A to the end portion B. The dummy lines 31 are disposed to fill the spaces in the insulator 3 which are not filled with the first linear member 11, the second linear member 12, and the third linear member 13. The dummy lines 31 have a function to keep the first linear member 11, the second linear member 12, and the third linear member 13 in their given positions.

Each dummy line 31 includes a core material 33, and an insulation layer 35, for example. The insulation layer 35 is formed on the outer periphery of the core material 33. Examples of a material for the insulation layer 35 may include rubber or plastic. Examples of rubber and plastic may include those included in the insulator 3.

Preferably, the material for the insulation layer 35 is the same as the rubber or the plastic used as the main component of the conductive layer 23 of the first linear member 11, the second linear member 12, and the third linear member 13. In this case, deformation of the third linear member 13 is less inhibited.

Preferably, the material and the diameter of the core material 33 are the same as the material and the diameter of the core materials 21 of the first linear member 11, the second linear member 12, and the third linear member 13. For example, when the core material 21 of each of the first linear member 11, the second linear member 12, and the third linear member 13 is an enameled wire, it is preferable that the material and the diameter of the core material 33 are the same as the material and the diameter of the conductor 25 of the enameled wire. In this case, it is possible to reduce the chances of having a direction in which the sensor cord 1 cannot be bent easily; and accordingly, occurrence of differences in detection accuracy can be reduced in the longitudinal directions L.

The first linear member 11, the second linear member 12, and the dummy lines 31 are disposed along the inner circumferential surface of the insulator 3 in a helical manner. The winding pitch of the first linear member 11, the second linear member 12, and the dummy lines 31 is preferably less than or equal to 50 mm. If the winding pitch is less than or equal to 50 mm, the detection accuracy of the point of application of the pressing force further improves.

The winding pitch of the first linear member 11 can be defined as follows: take a point on the first linear member 11 as Point PX; follow the first linear member 11 in a given direction from Point PX; and take a point on the first linear member 11 where its circumferential position first meets Point PX as Point PY. The winding pitch of the first linear member 11 equals to the distance between Point PX and Point PY in the longitudinal directions L. The winding pitches of the second linear member 12 and the dummy lines 31 can be defined likewise.

2. Configuration of Sensor System 101

Figure 4:
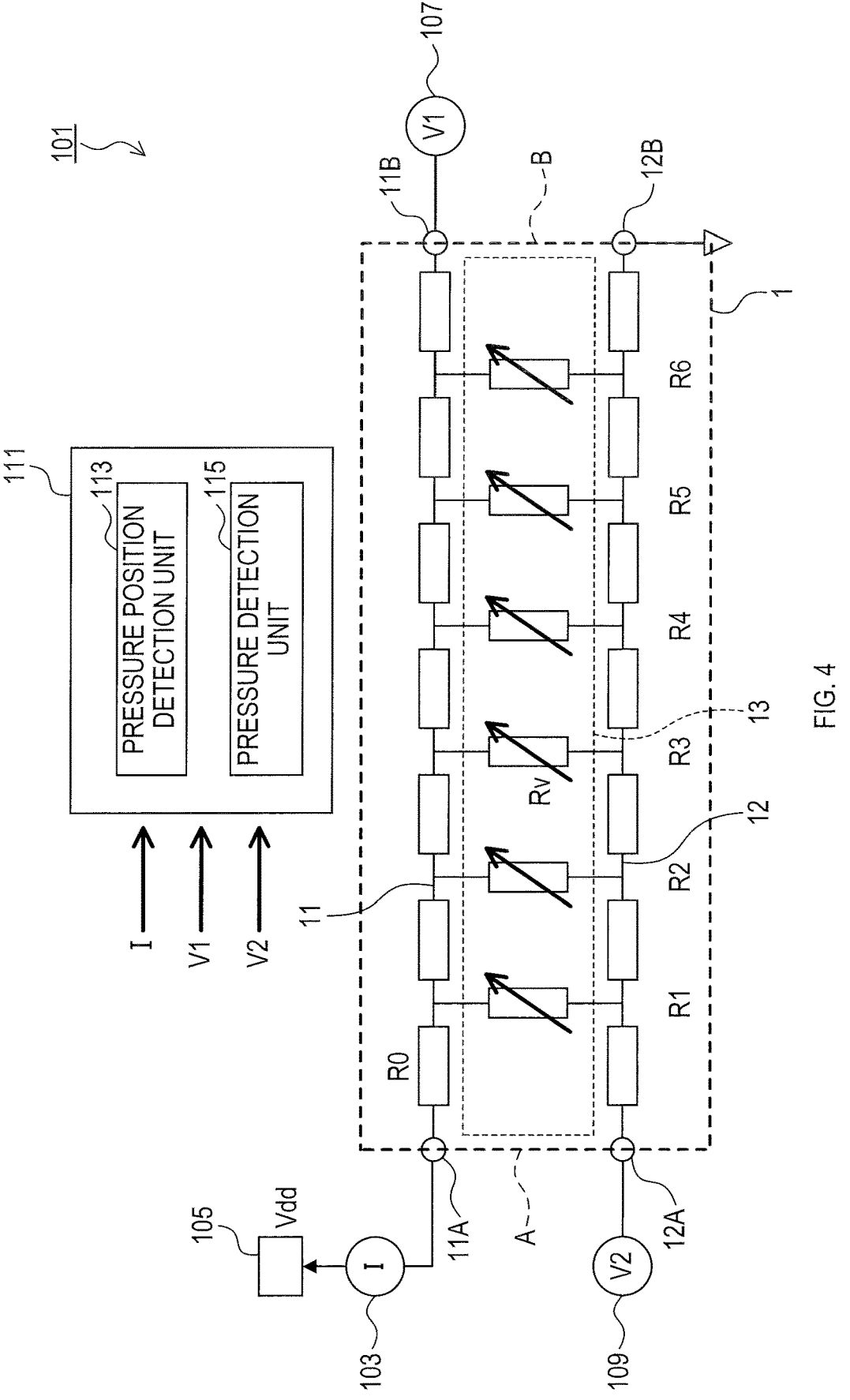
FIG. 4 is an explanatory diagram showing a configuration of a sensor system.

The configuration of a sensor system 101 will be explained with reference to FIG. 4. The sensor system 101 includes the sensor cord 1, an electric current measuring unit 103, a voltage application unit 105, a first voltage measuring unit 107, a second voltage measuring unit 109, and a calculator 111.

An end portion of the first linear member 11 on the side of the end portion A of the sensor cord 1 is referred to as an end portion 11A. The end portion 11A corresponds to an end portion 1A. The electric current measuring unit 103 measures an electric current I of the conductive layer 23 of the first linear member 11 at the end portion 11A.

The voltage application unit 105 applies a constant voltage Vdd to the conductive layer 23 of the first linear member 11 at the end portion 11A. The voltage Vdd is 5 V, for example.

An end portion of the first linear member 11 on the side of the end portion B of the sensor cord 1 is referred to as an end portion 11B. The end portion 11B corresponds to an end portion 1B. The first voltage measuring unit 107 measures a voltage V1 of the conductive layer 23 of the first linear member 11 at the end portion 11B.

An end portion of the second linear member 12 on the side of the end portion A of the sensor cord 1 is referred to as an end portion 12A. The end portion 12A corresponds to an end portion 2A. The second voltage measuring unit 109 measures a voltage V2 of the conductive layer 23 of the second linear member 12 at the end portion 12A.

An end portion of the second linear member 12 on the side of the end portion B of the sensor cord 1 is referred to as an end portion 12B. The end portion 12B corresponds to an end portion 2B. At the end portion 12B, the conductive layer 23 of the second linear member 12 is grounded.

The calculator 111 calculates a position of application of pressure on the sensor cord 1 and the magnitude of the pressing force F based on the electric current I measured by the electric current measuring unit 103, the voltage V1 measured by the first voltage measuring unit 107, and the voltage V2 measured by the second voltage measuring unit 109. The processes performed by the calculator 111 will be explained later.

The calculator 111 includes a microcomputer which includes a CPU and a semiconductor memory such as a RAM or a ROM. The function of the calculator 111 is achieved by the CPU executing a program stored in a non-transitory tangible storage medium. As a result of the execution of the program, a method corresponding to the program is performed. The calculator 111 may include one microcomputer or two or more microcomputers. The calculator 111 is an ECU, for example.

The calculator 111 is coupled to the electric current measuring unit 103, the first voltage measuring unit 107, and the second voltage measuring unit 109. The calculator 111 obtains the electric current I from the electric current measuring unit 103. The calculator 111 obtains the voltage V1 from the first voltage measuring unit 107. The calculator 111 obtains the voltage V2 from the second voltage measuring unit 109. The calculator 111 includes a pressure position detection unit 113 and a pressure detection unit 115.

3. Processes Performed by Sensor System 101

A case is assumed where the pressing force F is applied to Position Pi, a point randomly selected from Positions P1 to PN, on the outer circumferential surface of the sensor cord 1. Here, "i" is any natural number from 1 to N. For example, when "i" equals to 3, the point of application of the pressing force F is Position P3. The direction of the pressing force F is perpendicular to the longitudinal directions L.

Due to the pressing force F, the insulator 3 deforms into a shape having a partial depression at Position Pi. Also at Position Pi, one of the first linear member 11 or the second linear member 12 is displaced towards the other one of the first linear member 11 or the second linear member 12. Compression and deformation of the third linear member 13 thus occur at Position Pi. Particularly, the conductive layer 23 of the third linear member 13 is compressed and deformed.

As mentioned above, since the first linear member 11 and the second linear member 12 are disposed in a helical manner, there is a point in the vicinity of Position Pi where the first linear member 11, the third linear member 13, the second linear member 12 are aligned in this order along the direction of the pressing force F. At such a point, the third linear member 13 deforms as mentioned above.

The conductive layer 23 of the third linear member 13 is compressed and deformed at Position Pi; accordingly, the resistance value Rv of the conductive layer 23 of the third linear member 13 decreases at Position Pi.

Meanwhile, since the first linear member 11 and the second linear member 12 are bendable members, they are not easily displaced at locations other than Position Pi. Deformation of the third linear member 13 therefore does not easily occur at locations other than Position Pi. Accordingly, the resistance value Rv of the conductive layer 23 of the third linear member 13 remains large at locations other than Position Pi.

Figure 5:
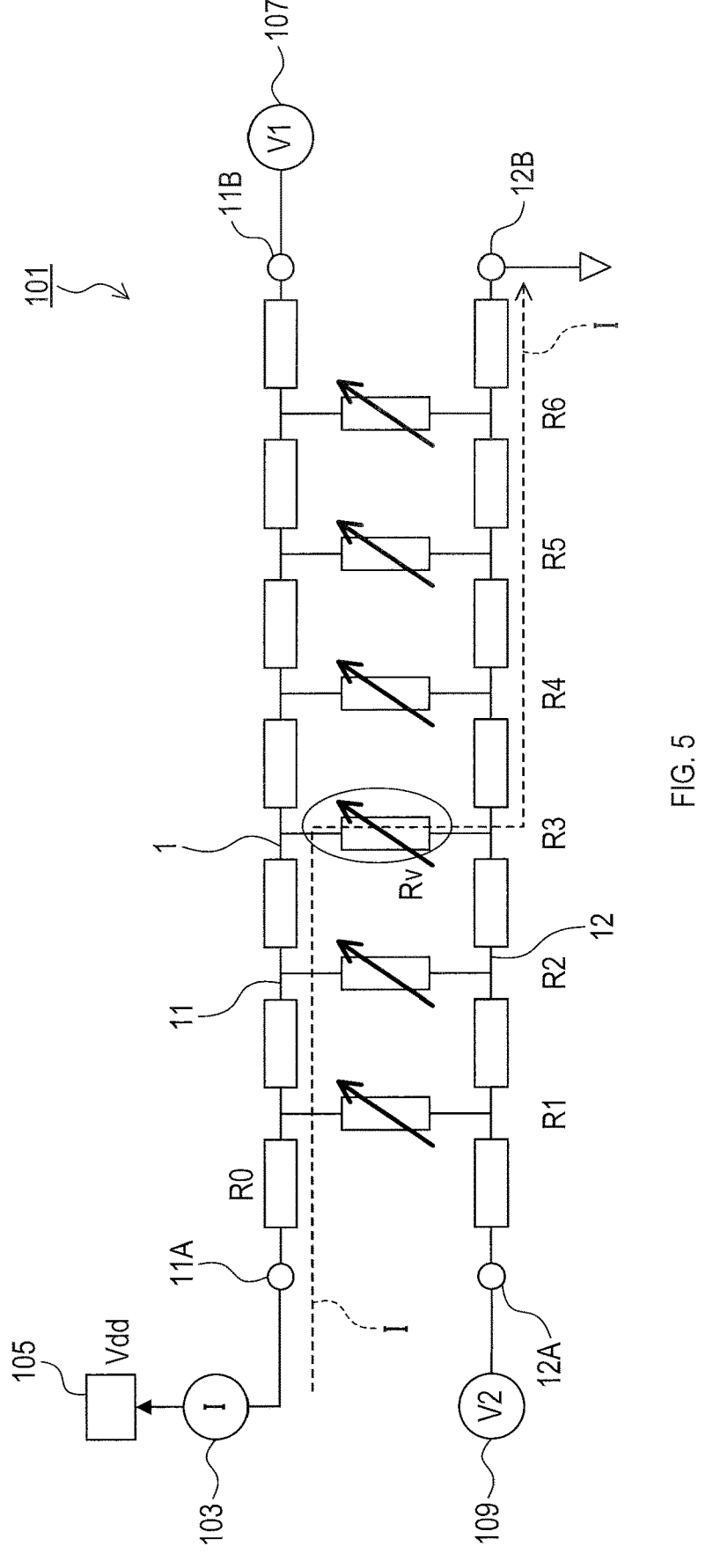
FIG. 5 is an explanatory diagram showing a path of an electric current I when a pressing force is applied to Position P3.

Since the resistance value Rv of the conductive layer 23 of the third linear member 13 is small at Position Pi but remains large at locations other than Position Pi, the electric current I flows as shown in FIG. 5. FIG. 5 shows an example where "i" equals to 3, and the pressing force F is applied to Position P3.

From the end portion 11A to Position Pi, the electric current I flows through the conductive layer 23 of the first linear member 11. At Position Pi, the electric current I flows from the conductive layer 23 of the first linear member 11 to the conductive layer 23 of the second linear member 12 via the conductive layer 23 of the third linear member 13. From Position Pi to the end portion 12B, the electric current I flows through the conductive layer 23 of the second linear member 12.

The following formula (1) and formula (2) are established in this circumstances.

$$i \times R0 \times I = (Vdd - V1) \qquad \text{Formula (1)}$$

$$V2 = (N - i) \times R0 \times I \qquad \text{Formula (2)}$$

In Formula (1) and Formula (2), R0 is resistance of the conductive layer 23 of the first linear member 11 per distance d. Formula (1) and Formula (2) yield Formula (3).

$$i = N \times (Vdd - V1)/V2 \qquad \text{Formula (3)}$$

In addition, the following Formula (4) is established.

$$Rv \times I = V1 - V2 \qquad \text{Formula (4)}$$

Formula (4) is deformed to yield Formula (5).

$$Rv = (V1 - V2)/I \qquad \text{Formula (5)}$$

The calculator 111 repeats the arithmetic processing at every given time. The arithmetic processing includes processing to obtain the electric current I, the voltage V1, and the voltage V2.

The arithmetic processing also includes processing to substitute the obtained voltage V1 and voltage V2 into Formula (3) and calculate "i". Since "i" is a value for identifying Position Pi where the pressing force F is applied, the processing to calculate "i" equals to the processing to calculate the point of application of pressure on the sensor cord 1. N and Vdd are known values, and these N and Vdd are stored in the calculator 111 in advance. R0 is 5Ω, for example. The processing to calculate "i" is performed by the pressure position detection unit 113.

The arithmetic processing also includes processing to substitute the obtained electric current I, voltage V1, and voltage V2 into Formula (5) and calculate the resistance value Rv.

Figure 3:
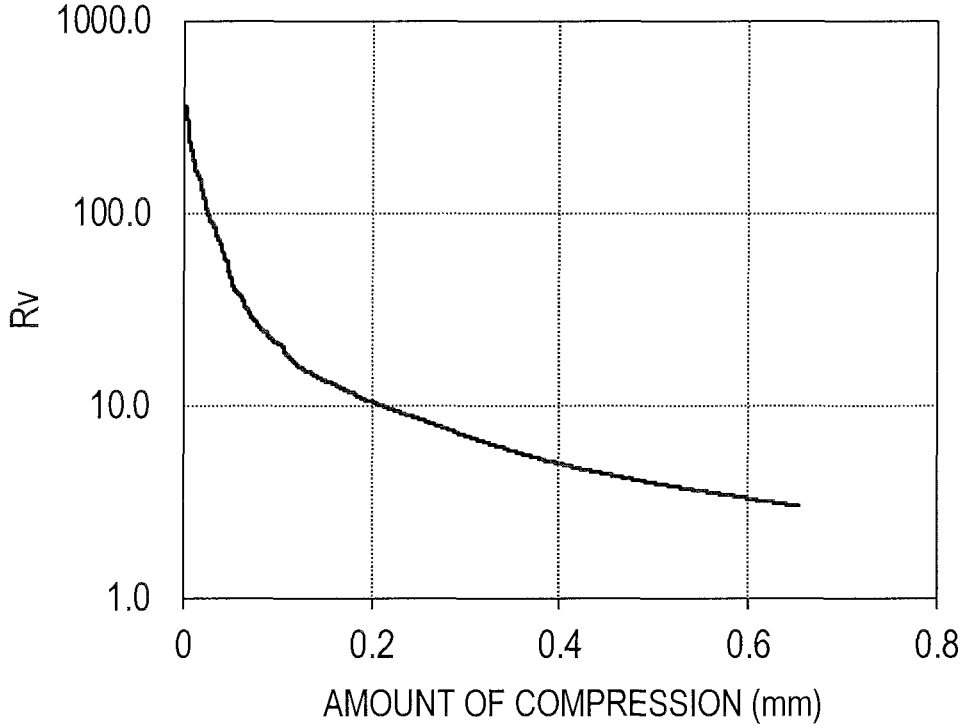
FIG. 3 is a graph showing a relationship between an amount of compression of a conductive layer and a resistance value of the conductive layer.

A map showing the relationship between the amount of compression and the resistance value Rv of the conductive layer 23 of the third linear member 13 as shown in FIG. 3 is stored in the calculator 111 in advance. The arithmetic processing includes processing to input the resistance value Rv obtained from Formula (5) into the map and calculate the amount of compression of the conductive layer 23 of the third linear member 13. Since the amount of compression of the conductive layer 23 of the third linear member 13 correlates with the magnitude of the pressing force F, the processing to calculate the amount of compression of the conductive layer 23 of the third linear member 13 equals to the processing to calculate the magnitude of the pressing force F. The processing to calculate the magnitude of the pressing force F is performed by the pressure detection unit 115.

When none of Position P1 to Position PN are applied with pressure, no electric current flows through the conductive layer 23 of the third linear member 13. In this case, since the V1 equals to 5, and the V2 equals to zero, Formula (3) yields zero for "i". Accordingly, the calculator 111 can determine that none of Position P1 to Position PN are applied with pressure.

Figure 6:
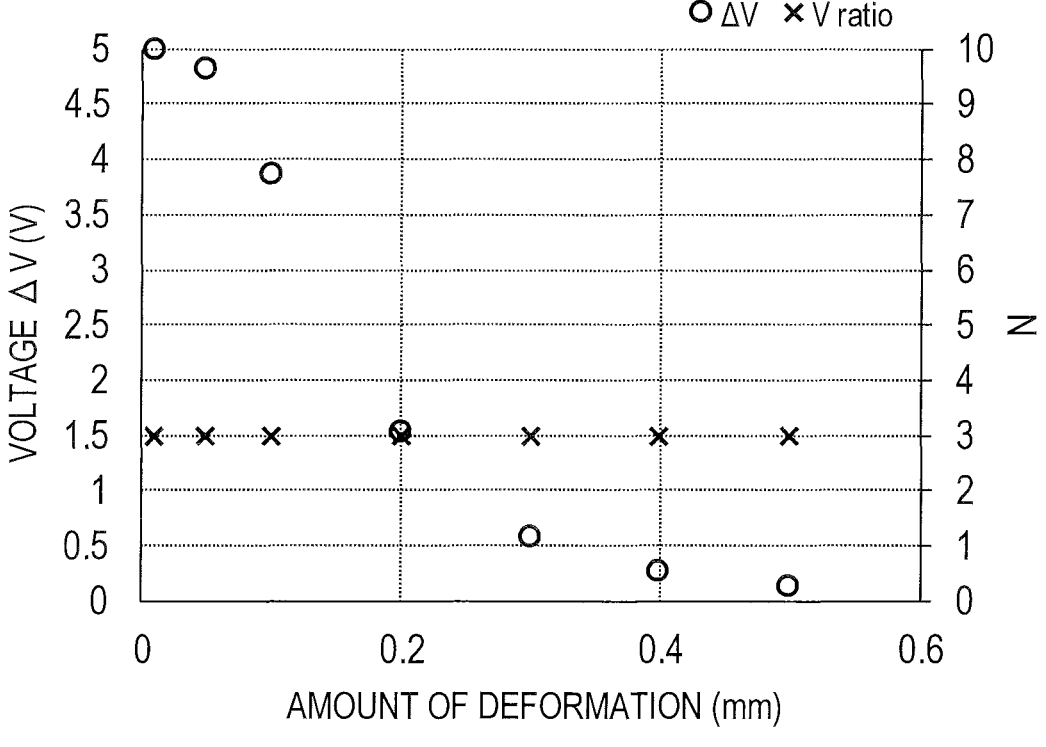
FIG. 6 is a graph showing results of model calculations for a relationship between an amount of deformation caused by an application of pressure, electric potential difference $\Delta V$, and Vratio when a pressing force is applied to Position P3.

FIG. 6 shows results of model calculations for a relationship between the amount of deformation caused by an application of pressure, electric potential difference ΔV, and Vratio when the pressing force F is applied to Position P3.

The electric potential difference $\Delta V$ is a value obtained by deducting the voltage V2 from the voltage V1. The Vratio represents (Vdd-V1)/V2.

Figure 7:
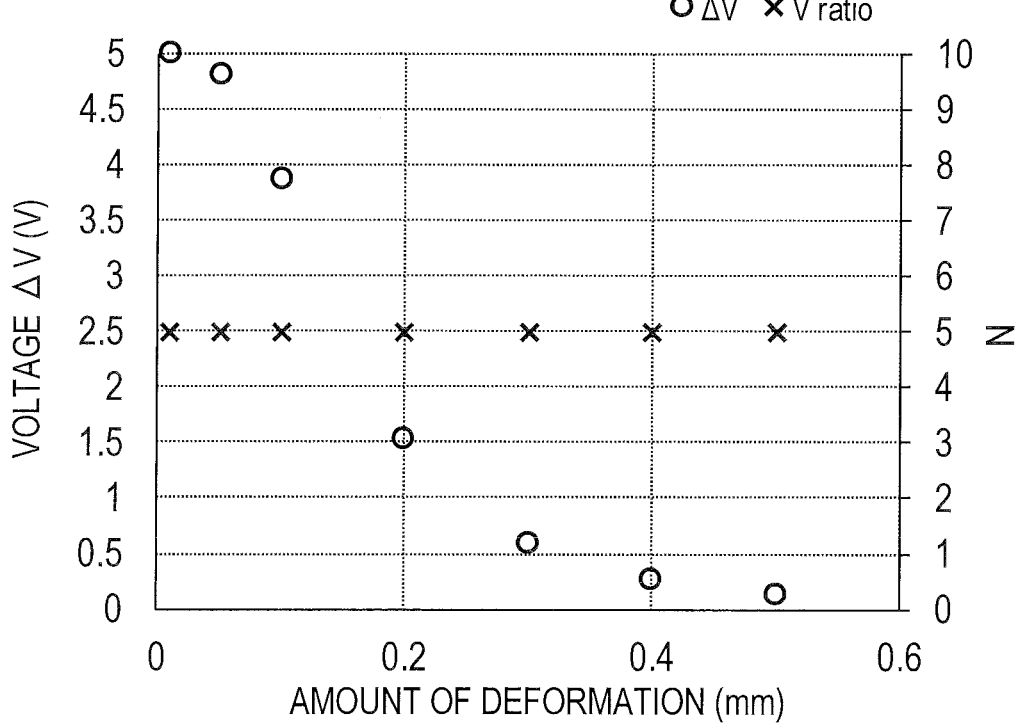
FIG. 7 is a graph showing results of model calculations for a relationship between an amount of deformation caused by an application of pressure, electric potential difference $\Delta V$, and Vratio when a pressing force is applied to Position P5.

FIG. 7 shows results of model calculations for a relationship between an amount of deformation caused by an application of pressure, the electric potential difference $\Delta V$, and the Vratio when the pressing force F is applied to Position P5. The model calculations shown in FIGS. 6 and 7 were based on the premise that the conductive layers 23 of the first linear member 11 and the second linear member 12 have resistivity ten times as high as the resistivity of the conductive rubber, the characteristics of which are shown in FIG. 3.

The "amount of deformation" in FIGS. 6 and 7 are values obtained by inputting the Rv calculated from Formula (5) into a map defining the relationship shown in FIG. 3.

Formula (1), Formula (2), and Formula (4) yield the following Formula (6).

$$N \times R0 \times I = Vdd - Rv \times I \qquad \text{Formula (6)}$$

When Vdd>>Rv×I, Formula (6) yields the following approximation formula (7).

$$I = Vdd/(N \times R0) \qquad \text{Formula (7)}$$

Formula (5) is deformed to yield Formula (8).

$$\Delta V = Rv \times I \qquad \text{Formula (8)}$$

As shown in Formula (7), the larger the result of N×R0 is, the smaller the I is. As shown in Formula (8), the smaller the I is, the smaller the $\Delta V$ is.

If the lowermost detectable value of $\Delta V$ is 0.02 V, the Rv is 50$\Omega$, and the Vdd is 5 V, N×R0 equals to 50 k$\Omega$ according to Formula (7) and Formula (8). N×R0 is the resistance value of the whole sensor cord 1. When the total length of the sensor cord 1 is 2 m, the resistance of the sensor cord 1 per unit length is 25 k$\Omega$/m.

When N×R0 is small, the electric current I at the time of driving the sensor increases, which imposes a burden on the system. When the upper limit value of the electric current I is 10 mA and the Rv is 50 k$\Omega$, N×R0 equals to 450$\Omega$. Accordingly, the resistance of the sensor cord 1 per unit length is preferably greater than or equal to 250 $\Omega$/m to limit the electric current I.

4. Method of Using Sensor System 101

The sensor system 101 can be used as a detection wire for a pedestrian protection device, for example. The pedestrian protection device is a device to protect a pedestrian when a vehicle collides with the pedestrian. Examples of the pedestrian protection device include an active hood airbag.

The sensor cord 1 is mounted to a front face of the vehicle, for example. The longitudinal directions L of the sensor cord 1 agree with width directions of the vehicle, for example. When the vehicle collides with a pedestrian, the pressing force F is applied to a given point on the sensor cord 1. The sensor system 101 detects the position of application of the pressing force F (in other words, the point of collision with the pedestrian) and the magnitude of the pressing force F (in other words, the magnitude of the force of collision with the pedestrian), and outputs the results of the detection to the pedestrian protection device.

5. Effects of Sensor Cord 1 and Sensor System 101

(1A) The sensor cord 1 does not necessarily have to include a tube and fluid filled in the tube. Thus, the cost for manufacturing the sensor cord 1 can be reduced, and a long-term reliability of the sensor cord 1 can be promised.

(1B) The sensor system 101 can detect the position of application of the pressing force F and the magnitude of the pressing force F.

(1C) The thickness of the conductive layer 23 of the third linear member 13 in the radial direction is greater than that of the conductive layers 23 of the first linear member 11 and the second linear member 12. Therefore, the amount of deformation on the conductive layer 23 of the third linear member 13 and the amount of variation of the resistance value Rv can be increased. As a consequence, the detection accuracy of the pressing force F can be further improved.

(1D) Each of the first linear member 11, the second linear member 12, and the third linear member 13 has the core material 21. This increases the strength of the first linear member 11, the second linear member 12, and the third linear member 13, and makes their elongation easy. Consequently, a long sensor cord 1 can be prepared, which can be easily cut out in a desired length, for example. The mass productivity of the sensor cord 1 can thus be improved.

(1E) Each of the first linear member 11, the second linear member 12, and the third linear member 13 has resistance greater than or equal to 250 $\Omega$/m in the longitudinal directions L. Accordingly, the electric current I can be reduced when the sensor cord 1 is applied with pressure, which consequently reduces a burden on the sensor system 101. In addition, it is preferable to set the resistance of the first linear member 11, the second linear member 12, and the third linear member 13 per unit length in the longitudinal directions L to be less than or equal to a given upper limit value. In this case, sensibility to detect the application of the pressure is improved since the $\Delta V$ increases when the pressure is applied to the sensor cord 1.

Other Embodiments

Although the embodiment of the present disclosure is explained above, the present disclosure may be implemented in various modifications without being limited to the aforementioned embodiment.

(1) The material for the core materials 21 of the first linear member 11, the second linear member 12, and the third linear member 13 may be a glass fiber, a tinsel wire, a carbon fiber, and super engineering plastic. Examples of the super engineering plastic may include polyphenylene sulfide. The material for the core material 21 is preferably an insulator.

(2) The first linear member 11, the second linear member 12, and the third linear member 13 does not have to include the core material 21 and may be formed of conductive rubber or conductive plastic as a whole.

(3) In the first embodiment, six positions, Position P1 to Position PN, are specified. Alternatively, N may be a value other than 6, for example, 2, 3, 10, 100, and 1000.

(4) The insulator 3 may be in a shape other than a cylinder. For example, the shape of the insulator 3 may be a rectangular cylinder, and a shape having a C-shaped cross section. The insulator 3 may include, on its side surface, a groove for communicating inside of the insulator 3 with outside of the insulator 3.

(5) The insulator 3 may include a material that plastically deforms.

(6) The calculator 111 and the procedure of the calculator 111 described in the present disclosure may be achieved by an exclusive computer provided with a processor and a memory programmed to perform one or more functions embodied by a computer program. Alternatively, the calculator 111 and the procedure of the calculator 111 described in the present disclosure may be achieved by an exclusive computer provided with a processor configured with one or more exclusive hardware logic circuits. Alternatively, the calculator 111 and the procedure of the calculator 111 described in the present disclosure may be achieved by one or more exclusive computers including a combination of a processor and a memory programmed to perform one or more functions, and a processor configured with one or more hardware logic circuits. In addition, the computer program may be stored in a non-transitory computer-readable tangible storage medium as an instruction executed by the computer. Software is not necessarily included in the procedure for achieving a function of each unit included in the calculator 111; all of the functions may be achieved by using hardware.

(7) Functions of one element in the aforementioned embodiments may be distributed to two or more elements, or functions of two or more element may be achieved by one element. A part of the configurations of each of the aforementioned embodiments may be omitted. In addition, at least a part of the configurations of each of the aforementioned embodiments may be added to or replaced with another part the configurations of the aforementioned embodiments.

(8) Other than the aforementioned sensor cord 1 and sensor system 101, the present disclosure can be achieved in various forms such as in a higher level system including the sensor system 101, in a program to cause the computer to function as the calculator 111, in a non-transitory tangible storage medium such as a semiconductor memory storing this program, a method of manufacturing the sensor cord 1, and a method of manufacturing the sensor system 101.

What is claimed is:

1. A sensor cord comprising:
a first linear member;
a second linear member;
a third linear member; and
a deformable insulation layer containing the first linear member, the second linear member, and the third linear member,
on a cross-sectional surface of the sensor cord taken perpendicular to longitudinal directions of the sensor cord, the third linear member being situated between the first linear member and the second linear member and contacting the first linear member and the second linear member,
in each of the first linear member, the second linear member, and the third linear member, at least an outermost peripheral part having electrical conductivity and having resistance greater than or equal to 250 Ω/m in the longitudinal directions,

the third linear member being configured to deform at a portion where pressure is applied, and
resistance of the portion where the pressure is applied being configured to vary depending on an amount of deformation.

2. The sensor cord according to claim 1,
wherein the outermost peripheral part of the third linear member includes conductive rubber or conductive plastic.

3. A sensor system comprising:
a sensor cord comprising:
a first linear member;
a second linear member;
a third linear member; and
a deformable insulation layer containing the first linear member, the second linear member, and the third linear member,
wherein, on a cross-sectional surface of the sensor cord taken perpendicular to longitudinal directions of the sensor cord, the third linear member is situated between the first linear member and the second linear member and contacting the first linear member and the second linear member,
wherein, in each of the first linear member, the second linear member, and the third linear member, at least an outermost peripheral part has electrical conductivity and has resistance greater than or equal to 250 Ω/m in the longitudinal directions,
wherein the third linear member is configured to deform at a portion where pressure is applied, and
wherein resistance of the portion where the pressure is applied is configured to vary depending on an amount of deformation,
an electric current measuring unit configured to measure an electric current at an end portion 1A, which is a first end portion of the first linear member;
a voltage application unit configured to apply a constant voltage to the end portion 1A;
a first voltage measuring unit configured to measure a voltage at an end portion 1B, which is a second end portion of the first linear member situated opposite the end portion 1A;
a second voltage measuring unit configured to measure a voltage at an end portion 2A, which is a first end portion of the second linear member; and
a calculator configured to calculate a position of application of pressure on the sensor cord and a magnitude of a pressing force based on the electric current measured by the electric current measuring unit, the voltage measured by the first voltage measuring unit, and the voltage measured by the second voltage measuring unit,
wherein an end portion 2B, which is a second end portion of the second linear member situated opposite the end portion 2A, is grounded.

4. The sensor system according to claim 3,
wherein an outermost peripheral part of the third linear member includes conductive rubber or conductive plastic.

* * * * *